United States Patent
Park

(10) Patent No.: US 7,146,154 B1
(45) Date of Patent: Dec. 5, 2006

(54) METHOD OF INFORMING CHARGING DATA TO MOBILE TERMINAL IN MOBILE RADIO COMMUNICATION SYSTEM

(75) Inventor: Young-Soo Park, Songnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 918 days.

(21) Appl. No.: 09/651,771

(22) Filed: Aug. 30, 2000

(30) Foreign Application Priority Data

Sep. 11, 1999 (KR) ................................ 1999-38856

(51) Int. Cl.
*H04M 11/00* (2006.01)
(52) U.S. Cl. .................. 455/406; 455/417; 455/408; 455/432.1
(58) Field of Classification Search ................ 455/405, 455/406, 408, 566, 466
See application file for complete search history.

(56) References Cited

U.S. PATENT DOCUMENTS

| | | | |
|---|---|---|---|
| 5,684,861 A * | 11/1997 | Lewis et al. ................ 455/405 |
| 5,915,214 A * | 6/1999 | Reece et al. ................ 455/406 |
| 6,044,258 A * | 3/2000 | Abdella ........................ 455/405 |
| 6,061,556 A * | 5/2000 | Rahman ....................... 455/406 |
| 6,104,792 A * | 8/2000 | Lautenschlager et al. ... 379/130 |
| 6,195,543 B1* | 2/2001 | Granberg ..................... 455/407 |
| 6,311,054 B1* | 10/2001 | Korpela ....................... 455/406 |
| 6,347,224 B1* | 2/2002 | Smyth et al. ................ 455/406 |
| 6,493,547 B1* | 12/2002 | Raith ........................... 455/405 |
| 6,516,190 B1* | 2/2003 | Linkola ....................... 455/408 |
| 6,546,238 B1* | 4/2003 | Nightingale et al. ........ 455/406 |

FOREIGN PATENT DOCUMENTS

FI  PCT/FI98/00515  *  6/1998

* cited by examiner

*Primary Examiner*—Temica Beamer
(74) *Attorney, Agent, or Firm*—Cha & Reiter, L.L.C.

(57) ABSTRACT

Disclosed is a method of informing charging data to a mobile terminal in a code division multiple access (CDMA) type or time division multiple access (TDMA) type mobile radio communication system which enables a mobile terminal subscriber to immediately confirm the telephone charges of the mobile terminal. According to the method, a mobile communication exchange detects the termination of a telephone call by the mobile terminal, and the mobile communication exchange produces charging information for the telephone call and informs the charging information to a charging center. The charging center in turn calculates the telephone charge using the charging information received therein and informs the calculated telephone charge to the mobile communication exchange, and the mobile communication exchange transmits the telephone charge information to the mobile terminal.

9 Claims, 4 Drawing Sheets

METHOD OF INFORMING CHARGING DATA TO MOBILE TERMINAL IN MOBILE RADIO COMMUNICATION SYSTEM

CLAIM OF PRIORITY

This application makes reference to and claims all the benefit accruing under 35 U.S.C. Section 119 from an application entitled, "Method of Informing Charging Data to Mobile Terminal in Mobile Radio Communication System, filed in the Korean Patent Office on Sep. 11, 1999 and there duly assigned Serial No. 1999-38856.

BACKGROUND OF THE INVENTION

1. Field of the Invention

The present invention relates to a method for informing charging data to a mobile terminal in a code division multiple access (CDMA) type or a time division multiple access (TDMA) type mobile radio communication system which enables a mobile terminal subscriber to immediately confirm, via his/her mobile terminal telephone, charge status that is calculated and managed by a charging center.

2. Description of the Related Art

Mobile communication system technology is widely used by individuals, automobiles, ships, trains, airplanes, etc. Specifically, the mobile communication system includes mobile telephones, such as portable telephones or telephones for vehicles, harbor telephones, telephones for airplanes, and mobile public telephones installed in the excursion ships, the express buses, etc. The mobile communication system also includes radio pagers, radio telephones, satellite mobile communication devices, amateur radios, fishery radios, etc. The advanced mobile phone service (AMPS) system is an analog type mobile communication system. In contrast, the CDMA and TDMA systems are digital type mobile communication systems.

FIG. 1 is a block diagram illustrating the construction of a conventional mobile radio communication system. Referring to FIG. 1, a mobile communication exchange 120 performs exchange functions and interacts with another mobile communication exchange. The mobile communication exchange 120 connects with a different communication network, such as a PSDN, and also controls a call termination/origination of a mobile terminal 100. In addition, the mobile communication exchange 120 informs the charging center 130 of charging information, such as a subscriber number, terminating number, call start time, call termination time, discount information and so forth, when the call is terminated in the mobile terminal 100. The charging center 130 calculates and manages telephone charges to provide the necessary charging information. For example, if thirty days elapse, the charging center 130 calculates an accumulated telephone charge for the calls made during the 30-day period for each mobile terminal subscriber, and notifies the respective mobile terminal subscriber of the total charge. A basic charge and a tax charge are added to the total telephone charge in the form of a bill 150.

According to the conventional mobile communication system described above, it can not know the call charge just after a mobile terminal subscriber terminates a telephone call. Also, there is no means for the mobile subscriber to instantly find out the current total telephone charge.

In order to solve the above problem, a mobile terminal having a built-in charging device has been developed. This charging device obtains call time information (i.e., call start time and call termination time) using a timer (not illustrated) provided in the mobile terminal. Typically, the timer is used to inform the mobile terminal subscriber of the call time through an output device (for example, a liquid crystal display) of the mobile terminal.

The timer starts its operation at the pointer of time when the mobile terminal detects a ring back tone transmitted to the mobile communication exchange, but there is a discrepancy between this time and an actual telephone call time. Thus, the telephone charge calculated by the charging device has an error in comparison to the telephone charge actually imposed on the mobile terminal subscriber by the vendor. Also, since the discount rate may be different according to the type of service enrolled in by the subscriber, an accurate telephone charge can not be known when such a discount rate is not considered. Furthermore, since the real bill contains a basic charge, a tax charge, and other charges not available till a subscriber receives the bill after, for example, 30 day billing cycle, the prior art mobile phone having the built-in timer does not given an accurate billing charge report.

SUMMARY OF THE INVENTION

Accordingly, the present invention has been made in an effort to solve the problems occurring in the related art, and an object of the present invention is to provide a method for informing charging data to a mobile terminal in a mobile radio communication system which enables a mobile terminal subscriber to immediately confirm through his/her mobile terminal a telephone charge for a telephone call or a total telephone charge that is calculated by a charging center just after terminating the call.

It is another object of the present invention to provide a method of immediately confirming charging information that is managed by a charging center if the mobile terminal subscriber requests the confirmation of the charging information using the mobile terminal in a standby state.

In order to achieve the above objects, according to the embodiment of the present invention, there is provided a first method of informing a telephone charge to a mobile terminal subscriber in a mobile communication system, the method comprising the steps of a mobile communication exchange detecting termination of a telephone call of a mobile terminal, the mobile communication exchange producing charging information for the telephone call, the mobile communication exchange informing the charging information to a charging center, the charging center calculating the telephone charge using the charging information and informing the calculated telephone charge to the mobile communication exchange, and the mobile communication exchange transmitting the telephone charge information to a mobile terminal.

In another aspect of the present invention, there is provided a second method of informing a total telephone charge to a mobile terminal subscriber in a mobile communication system, the method comprising the steps of a mobile terminal requesting confirmation of an accumulated telephone charge up to now or the total telephone charge to a mobile communication exchange in accordance with a command from the mobile terminal subscriber, the mobile communication exchange requesting the confirmation of the telephone charge for the mobile terminal subscriber to a charging center, the charging center informing the telephone charge to the mobile communication exchange, and the mobile communication exchange transmitting the telephone charge information to the mobile terminal.

BRIEF DESCRIPTION OF THE DRAWINGS

The above objects and advantages of the present invention will become more apparent by describing in detail the preferred embodiments thereof with reference to the attached drawings in which.

DETAILED DESCRIPTION OF THE PREFERRED EMBODIMENTS

Figure 1:
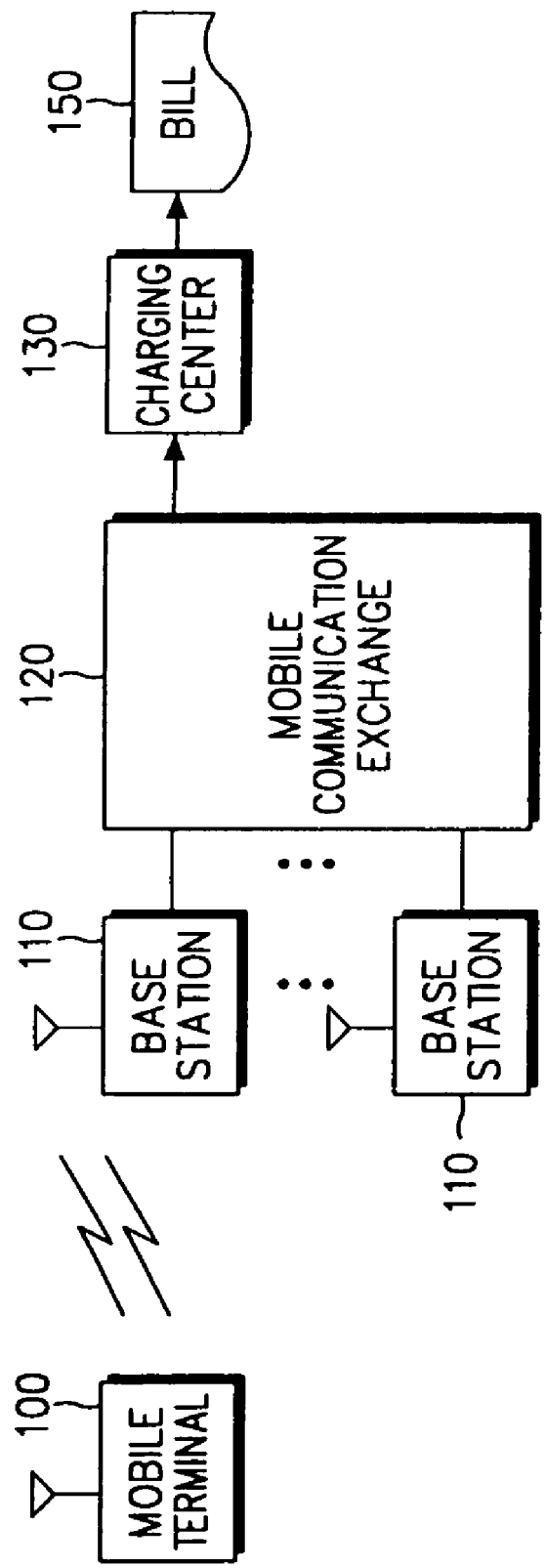
FIG. 1 is a block diagram illustrating the construction of a conventional mobile radio communication system.

The preferred embodiments of the present invention will now be explained in detail with reference to the accompanying drawings. In the drawings, the same or similar elements are denoted by the same reference numerals even though they are depicted in different drawings. For the purpose of clarity, a detailed description of well known functions and configurations incorporated herein will be omitted as it may make the subject matter of the present invention unclear.

Figure 2:
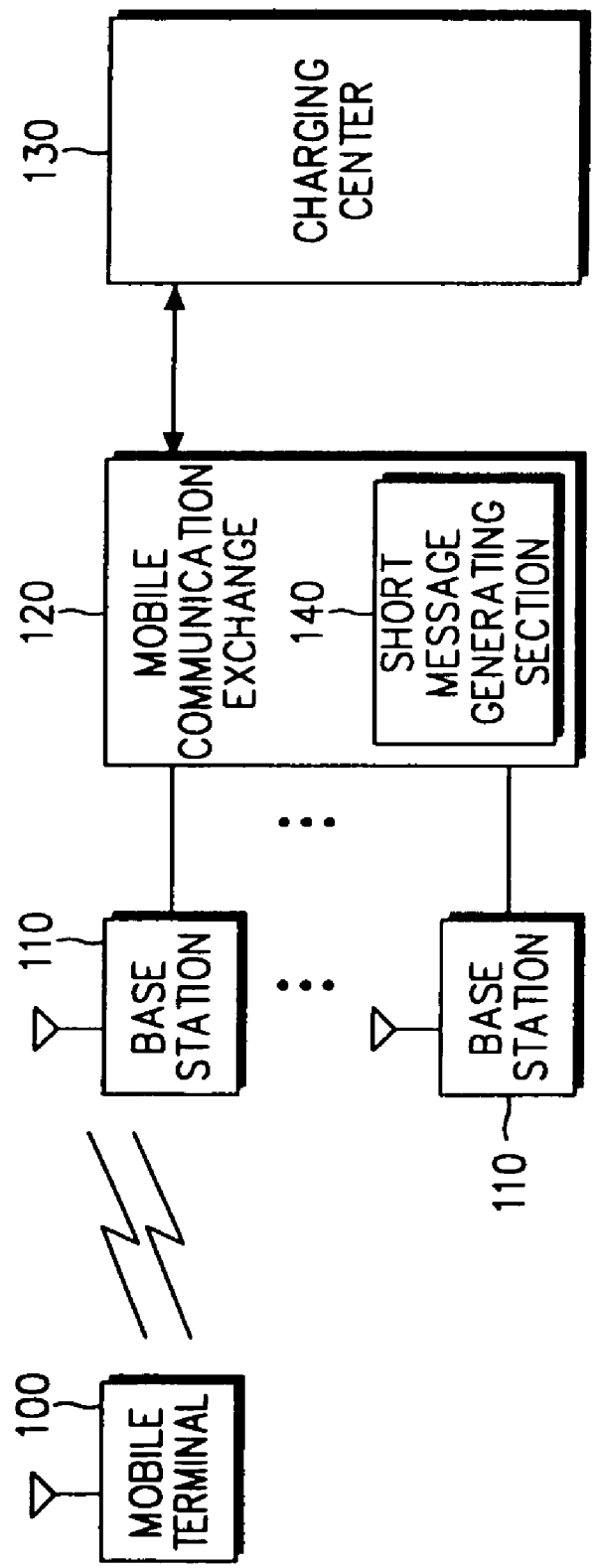
FIG. 2 is a block diagram illustrating the construction of a mobile radio communication system incorporating the present invention.

FIG. 2 is a block diagram illustrating the construction of a mobile radio communication system incorporating the present invention. Referring to FIG. 2, a mobile communication exchange 120 performs an exchange function and interacts with another mobile communication, or the exchange 120 connects with a different communication network, such as a PSDN, and controls the call termination/origination of a mobile terminal 100. In addition, the mobile communication exchange 120 informs the charging center 130 of charging information of a telephone call, such as the subscriber's number, terminating number, call start time, call termination time, discount information and so forth, when the call from the mobile terminal 100 terminates. The charging center 130 calculates and manages a telephone charge for the latest call, an accumulated telephone charge, and a total telephone charge using the charging information, then informs the respective telephone charges to the mobile communication exchange 120. Here, the management of the telephone charges is effected in such a manner that if thirty days elapses, the charging center 130 calculates the accumulated telephone charge for the calls made during the specific period for each mobile terminal subscriber, and notifies the respective mobile terminal subscriber of the total charge via mail. The bill includes a basic charge, a tax charge, and the calculated telephone charge.

Also, the mobile communication exchange 120 transmits to the mobile terminal 100 the telephone charging information, such as the telephone charge for the latest call, the accumulated telephone charge, and the total telephone charges that are transferred from the charging center 130. The mobile terminal 100 receives the telephone charging information and displays the information on the display section (not illustrated), so that the mobile terminal subscriber can identify it.

The mobile communication exchange 120 may be provided with a short message generating section 140. This short message generating section 140 generates a short message which corresponds to the telephone charging information, such as the telephone charge for the latest call, the accumulated telephone charge, and the total telephone charge that are transferred from the charging center 130 in the form of a short message.

The types of telephone charges transferred from the charging center 130 can be selectively determined according to the request by the mobile terminal subscriber. Thus, different telephone charge information including the latest call, the accumulated telephone charge, and the total telephone charge can be provided to the subscriber. For instance, the mobile terminal subscriber can be provided with the accumulated telephone charge for a duration of a specified time period that he/she desires from the charging center 130 using the mobile terminal 100. The type and the different telephone charge information transferred to the mobile terminal 100 may be predetermined or determined by the selection command from the mobile terminal subscriber. For example, the display unit of the mobile terminal can be pre-selected to display only the telephone charge for the latest call or only the total telephone charge, or both the latest call and the total telephone charge.

Figure 3:
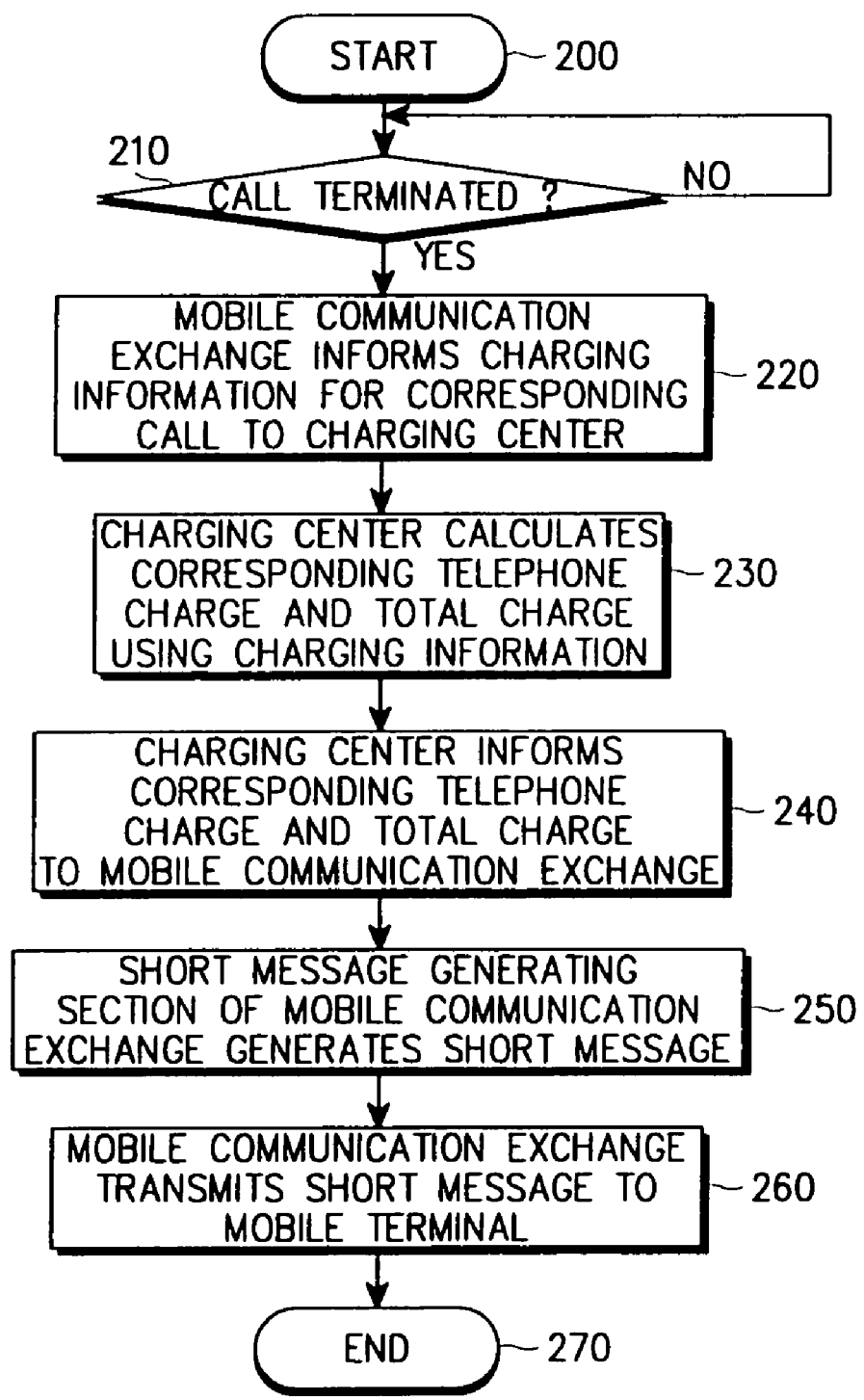
FIG. 3 is a flowchart illustrating a method of informing a mobile terminal of a telephone charge for a telephone call and the total telephone charge when the telephone call terminates according to an embodiment of the present invention; and, FIG. 4 is a flowchart illustrating a method of informing a mobile terminal of the total telephone charge in the case that the mobile terminal requests confirmation of the total telephone charge up to now in a standby state according to another embodiment of the present invention.

FIG. 3 is a flowchart illustrating a method of informing telephone charges to a mobile terminal for a telephone call and a total telephone charge call when the telephone call terminates according to the embodiment of the present invention.

With reference to FIG. 3, the mobile communication exchange 120 detects whether the telephone call from the mobile terminal 100 terminates (step 210). If the telephone call terminates, the mobile communication exchange 120 informs the charging center 130 of the charging information for the call, such as subscriber number, terminating number, call start time, call termination time, discount information, and so forth (step 220). The charging center 130 calculates the charge for the latest call and adds the calculated charge to the total telephone charge (step 230). The total telephone charge is calculated by adding up the accumulated telephone charge for each mobile terminal as well as the basic charge and the tax charge within a specified time period, for instance, a thirty-day period.

The charging center 130 informs the mobile communication exchange 120 of the charge information for the latest call as well as the total charge (step 240). The mobile communication exchange 120 receives the charge information for the latest call and the total charge, converts the received information in the form of a short message using the short message generating section 140, and transmits the generated short message to the mobile terminal subscriber 100 (steps 250 and 260). The mobile terminal 100 then receives the short message and displays the charge information of the latest call and the total charge on the LCD of the mobile phone. Preferably, it may display characters such as "Charge for the latest call: 400 won, Total charge: 10,500 won". Accordingly, the mobile terminal subscriber can immediately confirm the charge for the latest call as well as the total charge calculated to include the latest call FIG. 4 is a flowchart illustrating a method of informing a mobile terminal of the total telephone charge in the case that the mobile terminal requests confirmation of the total telephone charges up to now in a standby state according to another embodiment of the present invention.

Figure 4:
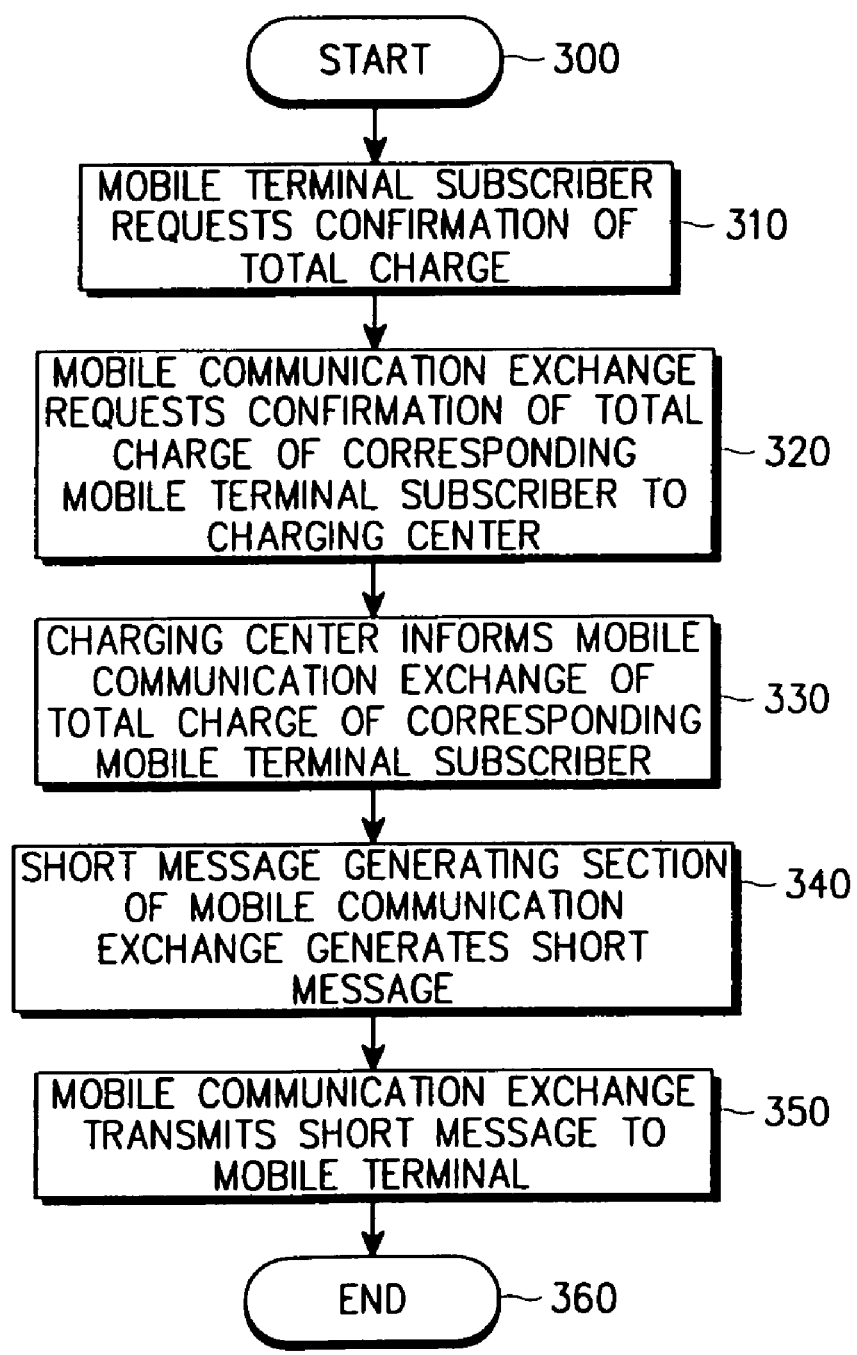

With reference to FIG. 4, if the mobile terminal subscriber intends to verify the total telephone charge up to now in a standby state, he/she can request for the total charge, for example, by sequentially pressing keys "*", "1", "1", and "SEND", or a specified key (step 310). If the mobile communication exchange 120 receives the request for the confirmation of the total charge for the mobile terminal 100 through the base station 110, the exchange 120 in turn requests the confirmation of the total charge of the mobile terminal subscriber to the charging center 130 (step 320). The charging center 130 searches the total charging information corresponding to the requesting mobile terminal subscriber and informs the mobile communication exchange 120 of the total charging information (step 330). The mobile communication exchange 120 generates a short message corresponding to the total charging information through the short message generating section 140 and transmits the short message to the mobile terminal 100 (steps 340 and 350). The mobile terminal 100 receives the short message, and displays the total charge on the LCD. Preferably, it may display characters such as "Total charge: 10,500 won (i.e. Korean currency)".

As described above, it will be apparent that the present invention provides advantages in that the mobile terminal subscriber can be provided with an accurate telephone charge information by enabling the subscriber to immediately verify the charging information calculated by the charging center through the mobile terminal just after a telephone call. Also, the mobile terminal subscriber can selectively verify at least one type of charging information out of various charging information managed by the charging center as occasion demands using the mobile terminal.

While this invention has been described in connection with what is presently considered to be the most practical and preferred embodiments which display both the charge for the latest call and the total charge or only the total charge, it is to be understood that other modifications thereof may be made without departing from the scope of the invention. For example, the accumulated telephone charge for a specified time period desired by the mobile terminal subscriber, or another type of charge information other than the latest call and the total charge can be selectively displayed. Thus, the present invention should not be limited to the disclosed embodiment but should be defined by the scope of the appended claims and their equivalents.

What is claimed is:

1. A method for informing a telephone charge to a mobile terminal subscriber in a mobile communication system, the method comprising the steps of:
   detecting, by a mobile communication exchange, a termination of a telephone call of a mobile terminal;
   providing, by the mobile communication exchange, charging information responsive to the telephone call;
   informing, by the mobile communication exchange, the charging information to a charging center;
   calculating, by the charging center, the telephone charge using the charging information received from the mobile communication exchange and informing the calculated telephone charge to the mobile communication exchange; and,
   transmitting, by the mobile communication exchange, the telephone charge information received from the charging center via a base station in communication with the mobile terminal, wherein the charging information includes the number of the mobile terminal, a terminating party number, a call start time information, a call termination time information, and different billing qualification information.

2. The method as claimed in claim 1, wherein the telephone charge represents a telephone service charge related to the telephone call made within a specified time period.

3. The method as claimed in claim 1, wherein the telephone charge is at least one amongst a telephone charge for a latest call, an accumulated telephone charge, and a total telephone charge selected by the mobile terminal subscriber.

4. The method as claimed in claim 1, further comprising the step of receiving, upon receiving the telephone charge information by the mobile terminal, displaying the telephone charge information in a display unit of the mobile terminal.

5. The method as claimed in claim 1, wherein the telephone charge information is in the form of a short message.

6. The method of claim 1, wherein said providing occurs when said telephone call has ended.

7. The method of claim 5, wherein a short message generating section generates said telephone charge information in said form of a short message, said transmitting occurring in said form of a short message.

8. A method of informing a telephone charge to a mobile terminal subscriber in a mobile communication system, the method comprising the steps of:
   actuating, by a mobile terminal subscriber, a specified key or specified sequence of keys to verify charge information by issuing, to a mobile communication exchange, a request for a telephone charge;
   upon receiving the telephone charge request, requesting, by the mobile communication exchange, the telephone charge for the mobile terminal subscriber to a charging center;
   calculating, by the charging center, the telephone charge using charging information corresponding to the mobile terminal subscriber;
   informing, by the charging center, the telephone charge to the mobile communication exchange; and,
   transmitting, by the mobile communication exchange, the telephone charge received from the charging center via a base station in communication with the mobile terminal subscriber, wherein the telephone charge calculated in said calculating, informed in said informing, and transmitted in said transmitting, is a telephone charge for a single telephone call.

9. The method of claim 8, wherein said single telephone call is a call that has just ended.

* * * * *